United States Patent
Claessens et al.

(10) Patent No.: US 7,222,255 B1
(45) Date of Patent: May 22, 2007

(54) SYSTEM AND METHOD FOR NETWORK PERFORMANCE TESTING

(75) Inventors: Aaron Claessens, Wheeling, IL (US); Chad Phillips, Arlington Heights, IL (US); Anthony Brummett, Des Plaines, IL (US)

(73) Assignee: 3Com Corporation, Marlborough, MA (US)

(*) Notice: Subject to any disclaimer, the term of this patent is extended or adjusted under 35 U.S.C. 154(b) by 918 days.

(21) Appl. No.: 09/795,730

(22) Filed: Feb. 28, 2001

(51) Int. Cl.
*G06F 11/00* (2006.01)

(52) U.S. Cl. .............................. 714/4; 714/43; 714/25; 709/224

(58) Field of Classification Search .................. 714/43, 714/4, 25; 709/224
See application file for complete search history.

(56) References Cited

U.S. PATENT DOCUMENTS

| | | | |
|---|---|---|---|
| 4,644,533 A | 2/1987 | Braff et al. .................... 370/94 |
| 4,881,263 A | 11/1989 | Herbison et al. ............. 380/21 |
| 4,996,685 A | 2/1991 | Farese et al. .............. 370/58.1 |
| 5,014,234 A | 5/1991 | Edwards, Jr. ............... 364/900 |
| 5,138,712 A | 8/1992 | Corbin ....................... 395/700 |
| 5,301,273 A | 4/1994 | Konishi ....................... 395/200 |
| 5,347,304 A | 9/1994 | Moura et al. ................. 348/12 |
| 5,430,727 A | 7/1995 | Callon ..................... 370/85.13 |
| 5,442,749 A | 8/1995 | Northcutt et al. ...... 395/200.09 |
| 5,488,412 A | 1/1996 | Majeti et al. ................. 348/10 |
| 5,489,897 A | 2/1996 | Inoue .................... 340/870.39 |
| 5,528,595 A | 6/1996 | Walsh et al. ............. 370/85.13 |
| 5,583,931 A | 12/1996 | Schneider et al. .......... 379/399 |
| 5,586,121 A | 12/1996 | Moura et al. ................ 370/404 |
| 5,598,410 A | 1/1997 | Stone ......................... 370/469 |
| 5,600,717 A | 2/1997 | Schneider et al. .......... 379/399 |
| 5,606,606 A | 2/1997 | Schneider et al. .......... 379/399 |
| 5,608,446 A | 3/1997 | Carr et al. ...................... 348/6 |
| 5,610,910 A | 3/1997 | Focsaneanu et al. ........ 370/351 |
| 5,623,542 A | 4/1997 | Schneider et al. .......... 379/399 |

(Continued)

FOREIGN PATENT DOCUMENTS

WO     WO 00/67385     11/2000

OTHER PUBLICATIONS

"Radio Frequency Interface Specification (Interim Specification) SP-RFI-I04-980724", MCNS Holdings, L.P., 1997, pp. ii to 196.

(Continued)

*Primary Examiner*—Scott Baderman
*Assistant Examiner*—Tim Bonura
(74) *Attorney, Agent, or Firm*—McDonnell Boehnen Hulbert & Berghoff

(57) ABSTRACT

A system and method for network performance testing are developed. One system includes a control network device configured to send network test performance settings configure at least one data generator and network switches so that each data generator sends test data via a plurality of network entities such as network ports or cable modems, for example. The exemplary system further includes at least one data receiver for receiving the test data from the at least one data generator via the network entities and an entity under testing such as a cable modem termination system, for example. In one embodiment, when a data receiver receives the test data, the data receiver provides the received test data to the control network device that generates a test result record based on the test data received on the data receiver.

17 Claims, 8 Drawing Sheets

U.S. PATENT DOCUMENTS

| | | | |
|---|---|---|---|
| 5,623,601 A | 4/1997 | Vu | 395/187.01 |
| 5,636,211 A | 6/1997 | Newlin et al. | 370/465 |
| 5,675,732 A | 10/1997 | Majeti et al. | 395/200.01 |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | 709/224 |
| 5,724,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,784,597 A | 7/1998 | Chiu et al. | 395/552 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 348/7 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 714/756 |
| 5,828,655 A | 10/1998 | Moura et al. | 370/326 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Anderson et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,055,236 A | 4/2000 | Nessett et al. | 370/389 |
| 6,058,421 A | 5/2000 | Fijolek et al. | 709/225 |
| 6,061,349 A | 5/2000 | Coile et al. | 370/389 |
| 6,064,372 A | 5/2000 | Kahkoska | 345/173 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan et al. | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,393,478 B1 | 5/2002 | Bahlmann | 709/224 |
| 6,393,483 B1* | 5/2002 | Latif et al. | 709/226 |
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 6,553,515 B1* | 4/2003 | Gross et al. | 714/4 |
| 6,601,185 B1* | 7/2003 | Bass et al. | 714/4 |
| 6,658,586 B1* | 12/2003 | Levi | 714/4 |
| 6,678,835 B1* | 1/2004 | Shah et al. | 714/4 |
| 2002/0122050 A1 | 9/2002 | Sandberg | 345/705 |
| 2002/0136165 A1 | 9/2002 | Ady et al. | 370/241 |
| 2003/0028891 A1 | 2/2003 | Hardt et al. | 725/107 |

OTHER PUBLICATIONS

"Radio Frequency Interface Specification (Interim Specification) SP-RFI-105-991105", MCNS Holdings, L.P., 1999, pp. ii to 202.

"Radio Frequency Interface Specification (Interim Specification) SP-RFIv1.1-106-001215", MCNS Holdings, L.P., 2000, pp. ii to 432.

J. Postel, "User Datagram Protocol", RFC 768, Aug. 28, 1980, pp. 1-3.

University of Southern California, "Transmission Control Protocol", RFC 793, Sep. 1981, pp. i-85.

Fielding et al., "Hypertext Protocol—HTTP/1.1", RFC 2068, Jan. 1997, pp. 1-162.

Jonathan B. Postel, "Simple Mail Transfer Protocol", RFC 821, Aug. 1982, pp. 1-68.

David C. Plummer, "An Ethernet Address Resolution Protocol", RFC 826, Nov. 1982, pp. 1-8.

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1-37.

Postel, J., *Internet Protocol, DARPA Internet Program Protocol Specification*, RFC 792, Sep. 1981, pp. 1-14.

Postel, J., *User Datagram Protocol*, RFC 768, Aug. 28, 1980, pp. 1-3.

RFC 793, *Transmission Control Protocol, DARPA Internet Program Protocol Specification*, Sep. 1981, pp. 1-68.

Case, J. et al., *A Simple Network Management Protocol (SNMP)*, RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vendor Extensions*, RFC 2132, Mar. 1997, pp. 1-27.

"Radio Frequency Interface Specification (Interim Specification) SP-RFIv1.1-103-991105", MCNS Holdings, L.P., 1999, pp. ii to 366.

* cited by examiner

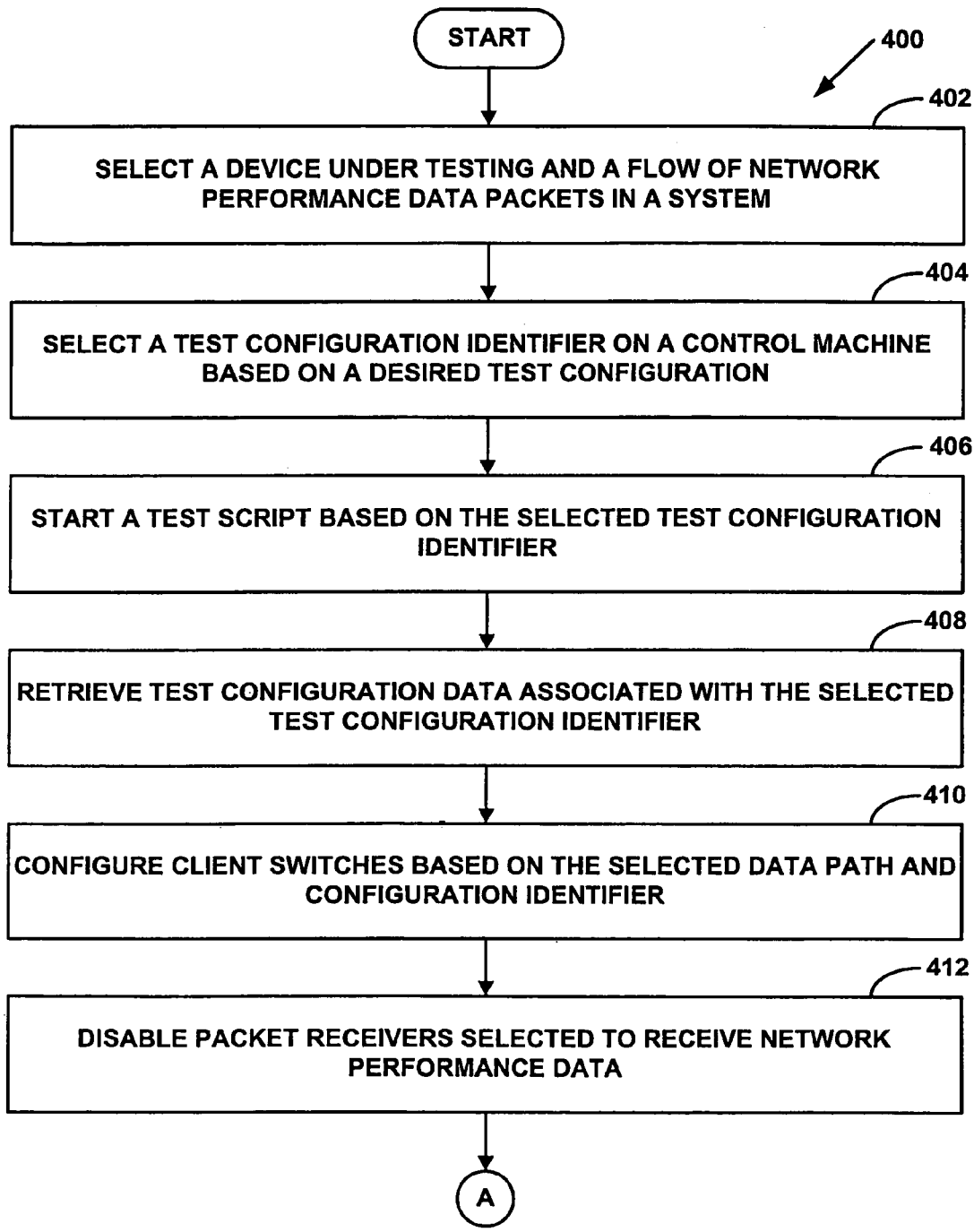

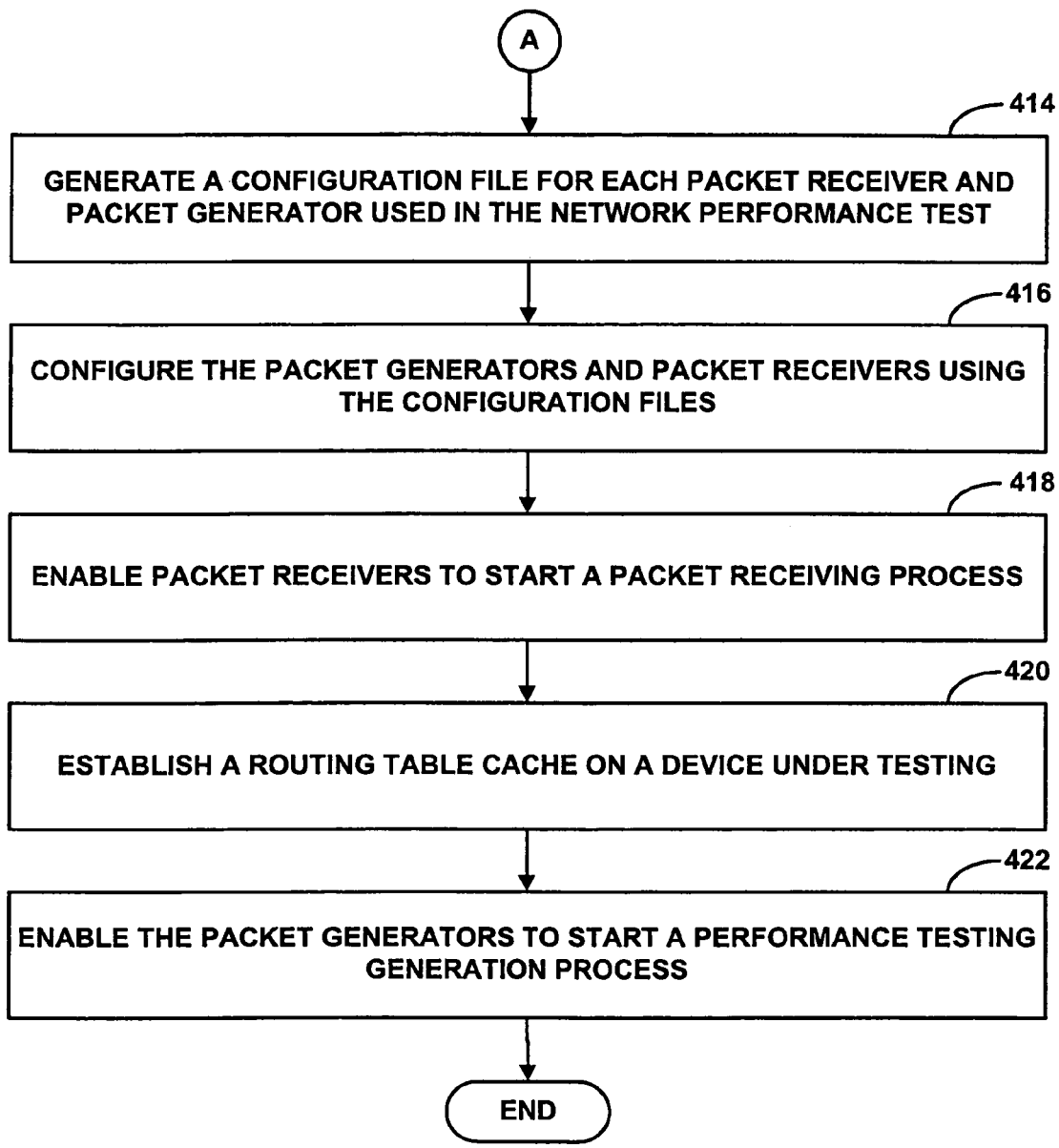

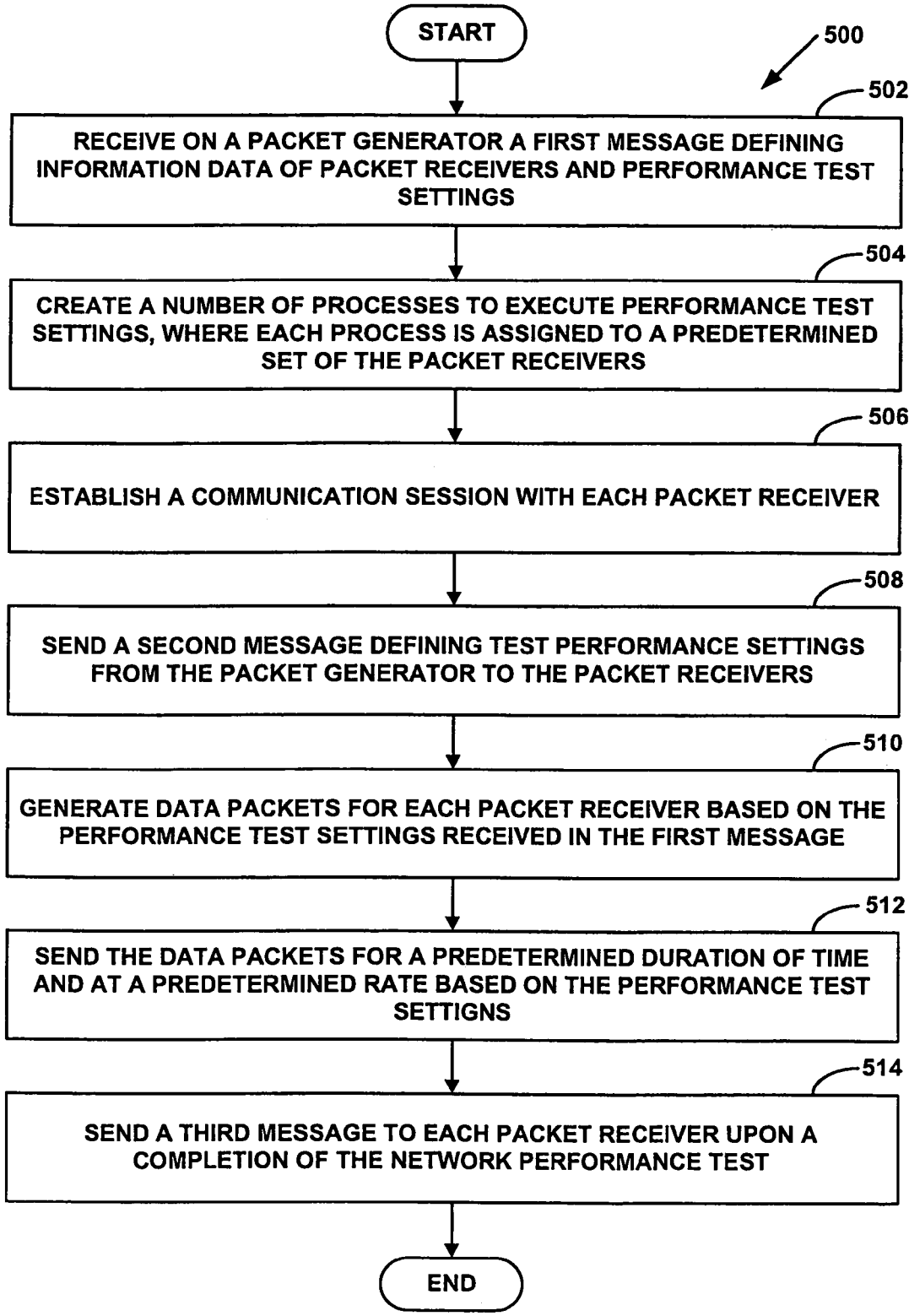

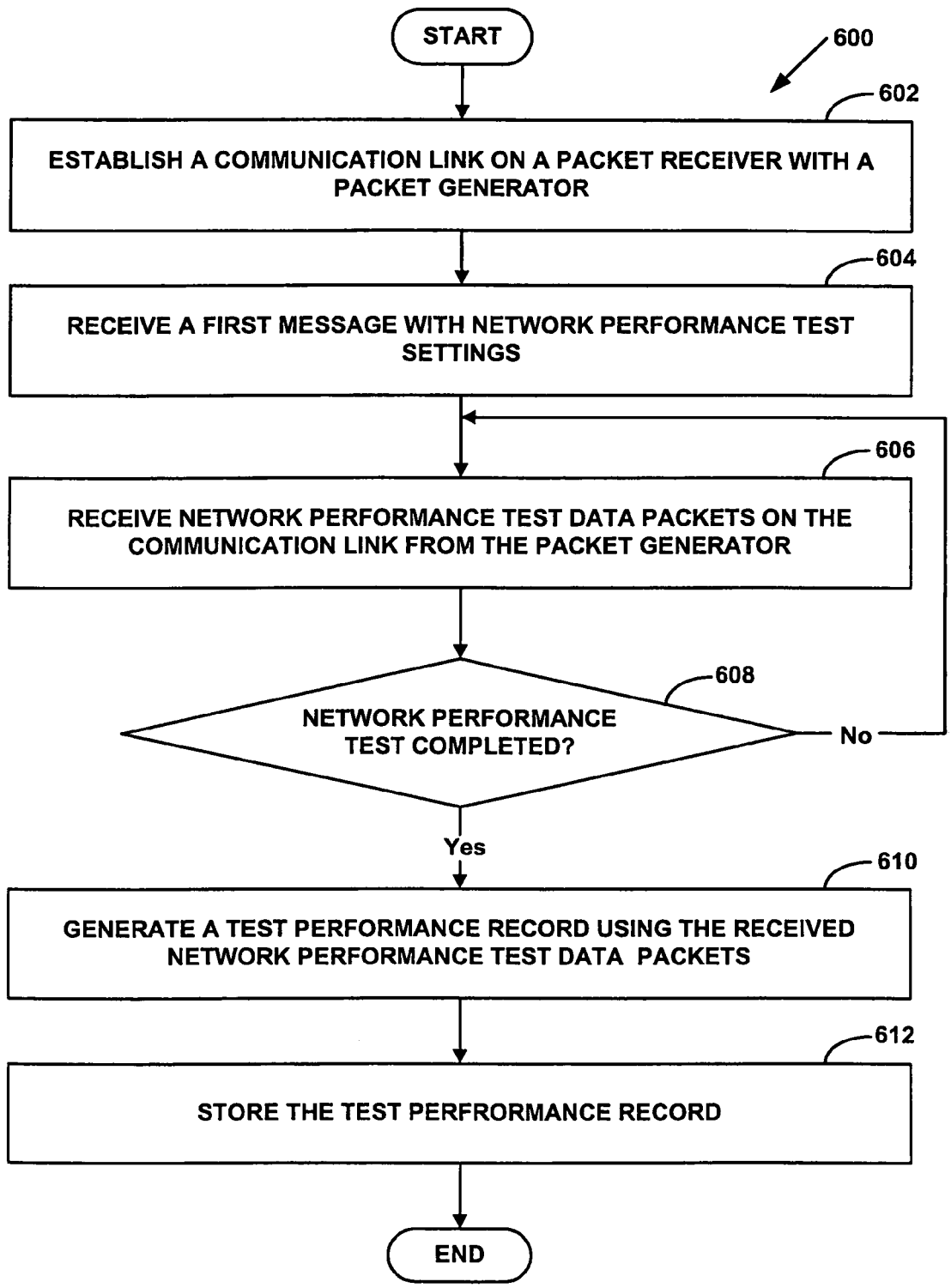

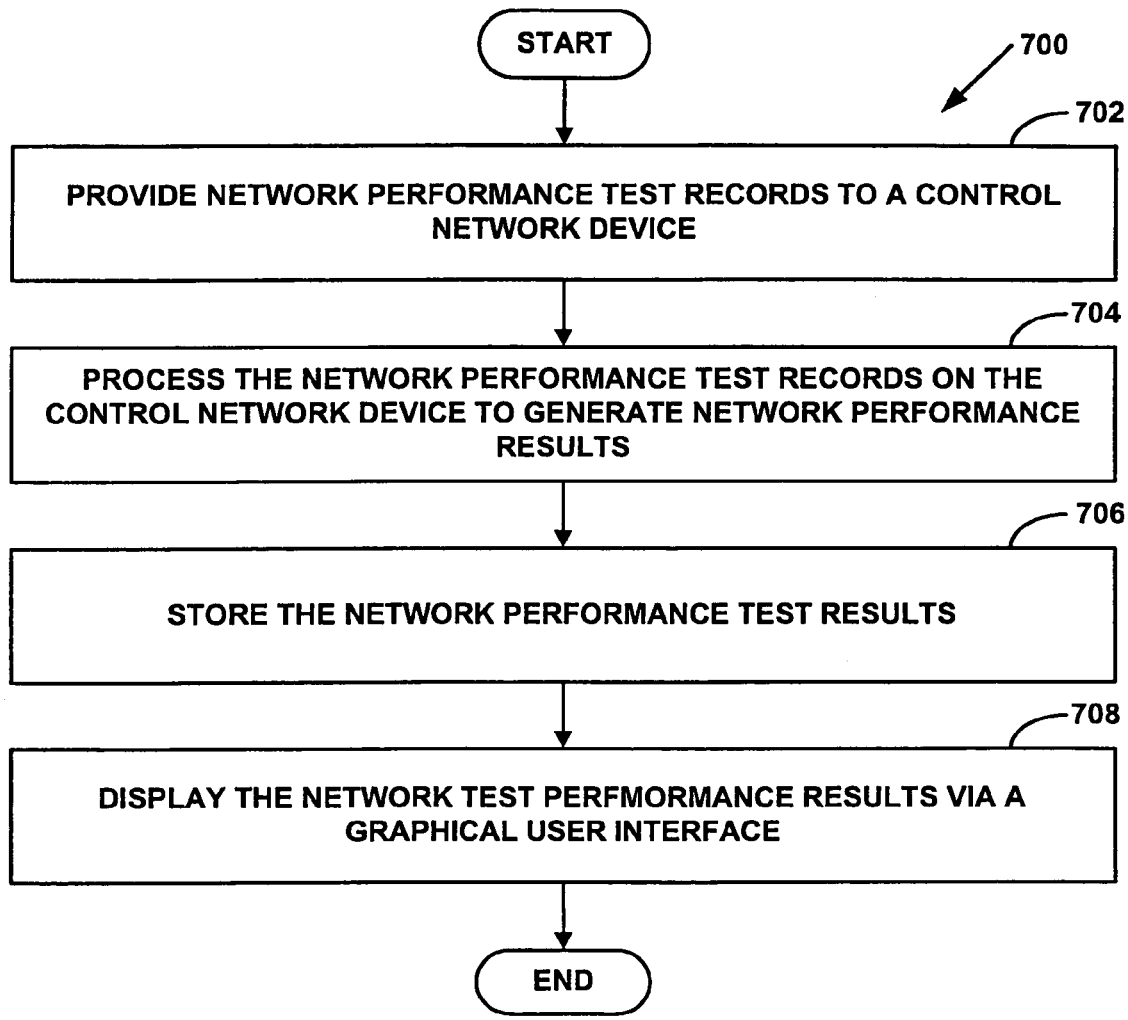

SYSTEM AND METHOD FOR NETWORK PERFORMANCE TESTING

FIELD OF THE INVENTION

The present invention relates to communications in computer networks. More particularly, it relates to a system and method for network performance testing.

BACKGROUND OF THE INVENTION

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+Mbps available on a coaxial cable or Hybrid Fiber Coaxial ("HFC") cable system on a cable television network.

With the explosive growth of the Internet, it is desirable to use the larger bandwidth of a cable television network to connect to the Internet and other computer networks. Cable modems, such as those provided by 3Com Corporation of Santa Clara, Calif., Motorola Corporation of Arlington Heights, Ill., Cisco Corporation of San Jose, Calif., Scientific-Atlanta, of Norcross, Ga., and others, offer customers a higher-speed connectivity to the Internet, an intranet, Local Area Networks ("LANs") and other computer networks via cable television networks. These cable modems currently support data connections to the Internet and other computer networks via a cable television network with a data rate of up to 30+ Mbps, which is a much larger data rate than can be supported by a modem used over a serial telephone line.

Cable modems access available bandwidth by sending and receiving data through the same coaxial cable that carries cable-television ("CATV") signals, rather than twisted-pair telephone wires used by dial-up and XDSL modems. Cable modems allow a computer user to send and receive information over a cable network. Many cable television networks provide bi-directional cable systems, in which data is sent "downstream", from a cable system "headend" to a customer, as well as "upstream", from the customer back to the headend. The cable system headend is a central location in the cable television network and is responsible for sending cable signals in the downstream direction and receiving cable signals in the upstream direction. An exemplary bi-directional data-over-cable system typically includes a customer premises equipment entity such a customer computer, a cable modem, a cable modem termination system ("CMTS"), a cable television network, and a data network such as the Internet.

A CMTS is located at the headend of a cable system and provides the interface where cable modems access the Internet. A CMTS performs functions such as bandwidth allocation and power level regulations while transmitting and receiving data to and from the cable modems. Both the cable modems and the CMTS modulate digital signals using techniques such as quadrature phase shift keying ("QPSK") modulation and quadrature amplitude modulation ("QAM").

Transmission between cable modems and CMTSs occurs in two separate frequency bands. On most US cable modem systems, downstream (CMTS-to-cable modem) data occupy 6 MHz channels between 50 to 860 MHz, and upstream (cable modem-to-CMTS) data occupy smaller bandwidth (200 kHz to 3.2 MHz) channels between 5 and 42 MHz. The downstream channel, having been used to transmit television signals that require superior transmission channel characteristics, supports complex modulation techniques such as 64-QAM and 256 QAM. Less complex and more robust modulation schemes such as QPSK and 16-QAM are typically used in the upstream channel to counteract the effects of ingress-undesired signals that leak into the cable system.

A modern cable network that supports broadcast television and high-speed data service combines fiber-optic and coaxial cable transmission facilities. Fiber-optic lines carry signals from the CMTS to a fiber node. Fiber-optic transmission lines carry signals over much greater distances than coaxial cables with fewer amplifiers. Reducing the number of amplifiers used on a cable system increases the channel capacity, improves the signal quality and reduces maintenance costs. Once the signals reach a fiber node, they are converted to coaxial cable lines, which carry the signals through the neighborhood to the subscribers' homes. Typically, a single fiber node on a coaxial cable line serves between 500 to 1000 cable service subscribers. However, other systems are possible as well, such as, a Fiber-To-The-Home ("FTTH") system, where an optical node serves a single subscriber and, thus, increases Quality of Service ("QoS") provided for the subscriber.

The distance between a cable modem subscriber and a CMTS dictates the amount of coaxial cable through which the digital signals must travel, and longer runs of cable typically produce more severe traffic losses. Further, the broadband nature of the cable network allows many cable modems to share the same communications media. This means that multiple cable modems are connected to a CMTS through a shared communication link.

Many applications that run on customer premise equipment entities such as personal computers or Voice over IP devices generate traffic at varying rates and generally require that network devices forward the traffic at the rates generated by the applications. Most network applications typically operate over a Transmission Control Protocol ("TCP") that enables two hosts to establish a connection and exchange data. The TCP guarantees a delivery of data packets in the order the data packets were sent. As is known in the art, each TCP connection session involves a bi-directional connection process, where a plurality of switches provide high speed switching of data packets and use information in a header of a TCP packets to manage TCP traffic.

Some network applications may be less tolerant to traffic delays or losses than others. If infinite network resources were available, all application traffic could be carried at the application's required rate with no packet loss. However, network resources are not infinite, and test performance systems for testing network equipment are necessary to optimize the network capacity.

Testing of network devices is typically based on a throughput, or the ability to forward packets of various sizes between input (ingress) ports and output (egress) ports, measured in packets per seconds ("pps") with measurable delay (latency) and delay variability (jitter). Typically, the biggest challenge experienced during testing of network devices is the ability to generate enough traffic to determine a point where a device under test starts to drop packets and reaches a saturation point.

One of the existing systems for network performance testing is the Netcom SmartBits™ system. The Netcom SmartBits™ emerged as a default industry standard testing tool for generating large amounts of traffic on many ports and measuring the results for the network performance such as throughput, latency and jitter. The Netcom system generates packets with a fixed-length or variable-length packets while receiving packets, and provides a testing tool for multiple modular ports. However, the Netcom system requires using a separate testing device (testing cards) for each device under testing. On a receiving side, each testing card contains counters to monitor such parameters as a number of packets that were transmitted, a number of packets that were received, byte counts, and collisions, for example. In the Netcom system, a Windows programming interface allows to program individual cards, monitor their status, and view the network performance data generated on each card.

However, the Netcom network testing systems are typically very expensive and limited in the sense that a network system requires a separate card for each network device to be tested in the network. In addition, there are other limitations associated with the Netcom system. Specifically, the Netcom cards place limitations on the types of traffic data that can be generated. For example, it is known in the art, that the Netcom system can generate data packets with IP headers, but cannot generate or test data using TCP sessions. Further, the packets generated on each card of the Netcom system have to be of one type, and sending a plurality of different packets using a single Netcom device is not possible.

FIG. 1 is a block diagram illustrating an exemplary Netcom SmartBits™ system architecture 100 in a data-over-cable system. As shown in FIG. 1, the system 100 includes two SmartBits™ devices 104, 106 connected with a link cable 108, where each SmartBits™ device has a plurality of SmartBits™ cards. As mentioned in the proceeding paragraphs and shown in FIG. 1, each SmartBits™ card is connected via a testing network connection (testing connections 110A–110G) to one cable modem (cable modems 114A–114G). FIG. 1 illustrates a two-way data-over-cable system where an upstream connection and a downstream connection are provided via a cable network 118 terminated with a CMTS 116 located at a head-end of the data-over-cable system. As is known in the art, each card has internal logic to perform network performance analysis for a device under testing. Once the performance analysis is completed, the Netcom cards provide the performance analysis data to a control network device 102. The control network device 102 has a graphical user interface functionality and, thus, displays the test results to system administrators. However, as mentioned in the proceeding paragraphs, the Netcom system has the ability to send only one type of packets in one direction of data flow and, thus, in the system shown in FIG. 1, all cards in the devices 104 and 106 generate the same type of packets. Further, the Netcom system has the limited ability to generate different protocols of data packets. The packets generated by the Netcom cards have to be of one type (the same protocol, the size, etc.) and sending a plurality of different packet types using the Netcom tools is not possible.

The existing network performance testing tools are generally limited in their ability to efficiently test networks under varying operating conditions. It is increasingly important to analyze the network conditions without limitations of the existing tools. In addition, eliminating the need for having a separate testing device at each port and providing greater flexibility of the testing tools would provide better means to test network under actual operating conditions. Therefore, it is desirable to develop an efficient and comprehensive network testing system.

SUMMARY OF THE INVENTION

According to an exemplary embodiment, a system and method are developed for network test performance testing.

In one embodiment, the system includes a control network device configured to send network test performance settings, and at least one data generator configured to receive the network test performance settings from the control network device and generate test data using the network test performance settings. In one embodiment, the control network device provides a configuration file to each data generator, and the configuration file includes a plurality of network address pairs. The control network device configures the data generator to send data via a plurality of network entities configured to receive the test data from the at least one data generator. The data generator uses a unique network address pair to generate the test data for each of the network entities. For example, the plurality of network entities may include a plurality of network ports, network devices or cable modems. In one embodiment, the system further includes at least one network switch configured to enable data communication from the at least one data generator to the plurality of network entities, at least one entity under testing configured to receive the test data from the plurality of network entities, and at least one data receiver configured to receive the test data from the plurality of network entities via the entity under testing. In one embodiment, the at least one data receiver is configured to provide the test data to the control network device. When the control network device receives the test data from the data receivers, the control network device generates a test result record based on the test data received from the at least one data receiver.

These as well as other aspects and advantages of the present invention will become more apparent to those of ordinary skill in the art by reading the following detailed description, with reference to the accompanying drawings.

BRIEF DESCRIPTION OF THE DRAWINGS

Preferred embodiments of the present invention are described with reference to the following drawings, wherein:

FIGS. 4A and 4B are a flow chart illustrating an exemplary method for configuring network devices in a network performance testing system according to an exemplary embodiment;

FIG. 5 is a flow chart illustrating an exemplary method for an operation of packet generators according to an exemplary embodiment;

FIG. 6 is a flow chart illustrating an exemplary method for an operation of packet receivers according to an exemplary embodiment; and FIG. 7 is a flow chart illustrating an exemplary method for processing and generating network performance test results according to an exemplary embodiment.

DETAILED DESCRIPTION OF AN EXEMPLARY EMBODIMENT

The current apparatus and methods propose a flexible and comprehensive system for performance and stress testing of network equipment entities such as CMTSs, switches or routers, for example. One embodiment allows for a completely distributed system that generates and passes various types of packets to any port under test. Further, the network testing system according to an exemplary embodiment overcomes a need for having a separate testing device attached to each port under test and allows for a cheaper network performance testing method.

Figure 1:
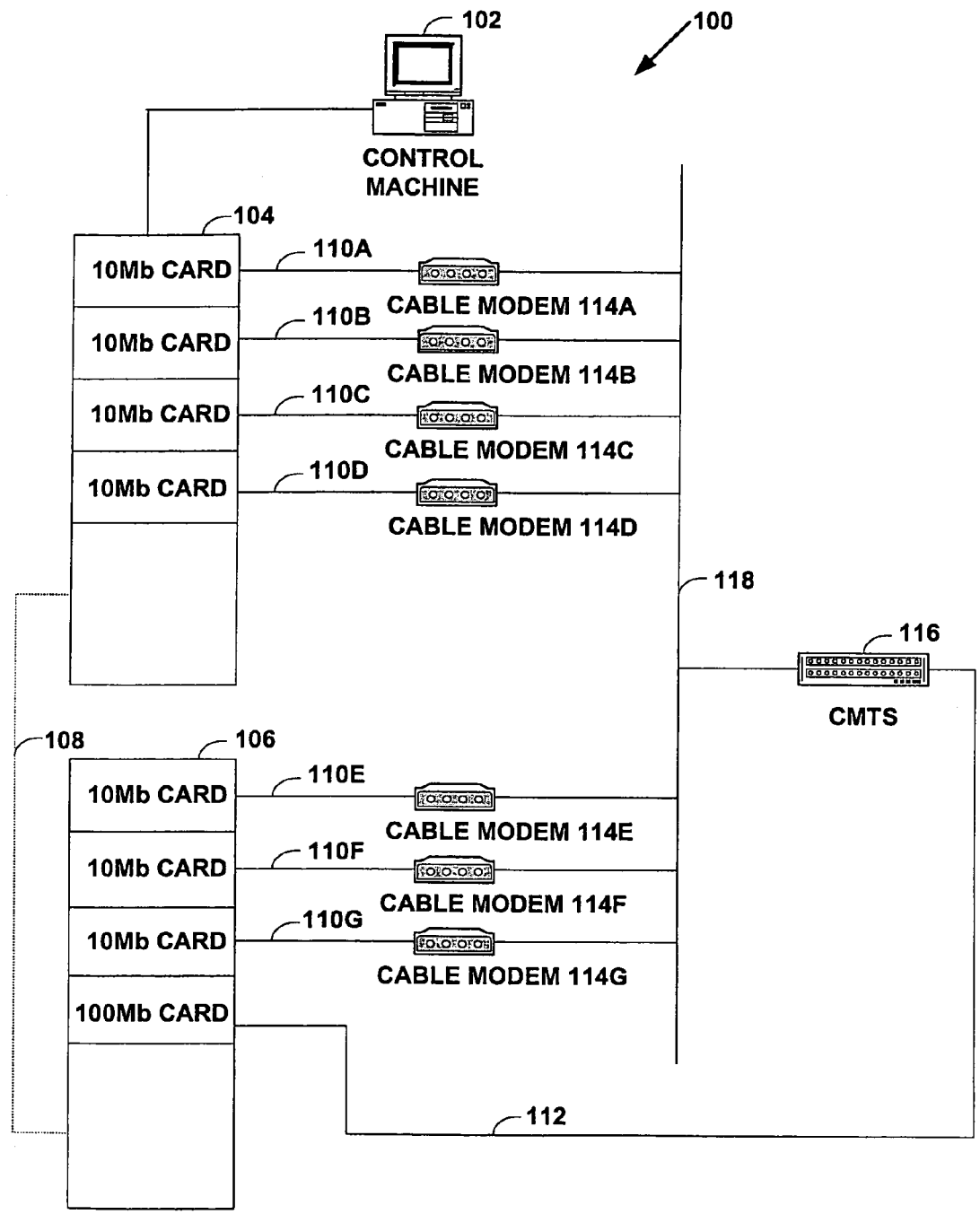
FIG. 1 is a block diagram illustrating an exemplary network performance testing system employed in one of the existing prior art technologies.
Figure 2:
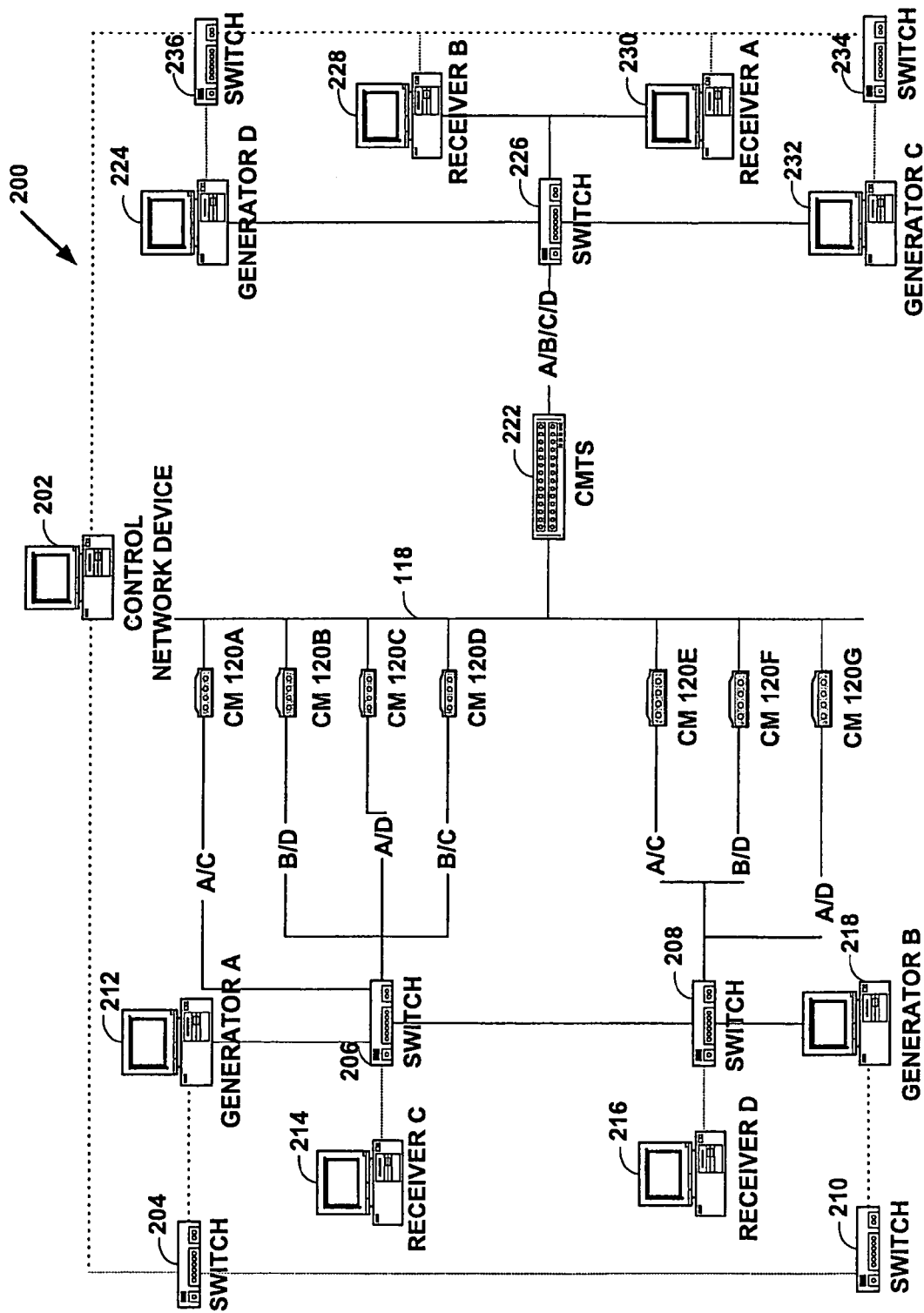
FIG. 2 is a block diagram illustrating an exemplary network performance testing system according to an exemplary embodiment.

FIG. 2 is a block diagram illustrating a network performance testing system 200 according to an exemplary embodiment. The system 200 includes a management network that is illustrated with dotted network connection lines and a test network that is illustrated with continues network connection lines. The exemplary network performance testing system 200 is based on four main components: a control network device 202, packet generators 212, 218, 224, 232, packet receivers 214, 216, 228, 230, and network switches 204, 206, 208, 210, 226, 234, 236 interconnecting all components of the system.

According to an exemplary embodiment, the packet generators 212, 218, 224, 232 generate and send packets based on the instructions from the control network device 202. In one embodiment, the packet generators are personal computers ("PCs") such as IBM PCs having K7 Athlon processors running the Linux operating system having application software for generating various types of data packets such as User Datagram Protocol ("UDP") data packets. As is known in the art, the UDP is a connectionless mode protocol providing a datagram communication mode for delivery of packets to a remote or local user. However, the exemplary embodiment is not limited to the packet generators generating only the UDP packets, and the packet generators could generate other types of packets. For example, the packet generators could generate Transmission Control Protocol ("TCP") traffic in the form of File Transfer Protocol ("FTP") packets. As is known in the art the TCP is a method used along with the Internet Protocol ("IP") to send data in a form of message units between computers over the Internet. While IP takes care of handling the actual delivery of data, the TCP takes care of keeping track of individual units of data (packets) that a message is divided into for efficient routing through the Internet. The FTP, in contrast, provides the simplest way to exchange files between computers on the Internet. Similarly to the Hypertext Transfer Protocol ("HTP"), which transfers displayable Web pages and related files, and the Simple Mail Transfer Protocol ("SMTP"), which transfers e-mail, the FTP is an application protocol that uses the Internet TCP/IP protocols. The FTP is commonly used to transfer files from their creator to a computer that acts as their server for everyone on the Internet. However, the exemplary embodiment is not limited to these protocols, and a packet generator could generate other types of data packets such as Realtime Transport Protocol ("RTP") data packets, for example.

The exemplary embodiment is not limited to using the Linux operating systems on the generators, and other types of operating systems could also be used. Additionally, the exemplary system is not limited to four packet generators generating four different types of packets, and more or fewer packet generators could also be used. Further, the exemplary embodiment is not limited to using PCs having the K7 Athlon processors as the packet generators, and different or equivalent processors could also be used. For example, an Apple G4 having a Power PC processor could also be used as a packet generator. However, in such an embodiment, more packet generators would be required to generate the same amount of data, since a data generation rate on a Pentium III processor is typically lower that a data generation rate on a K7 Athlon processor. On the contrary, if processor architectures developed in a future have faster front buses, then, a lower number of packet generators could be used to generate the same amount of data at a required data rate.

According to an exemplary embodiment, each packet generator is associated with one or more packet receivers. FIG. 2 illustrates a system architecture where each packet generator is associated with a single packet receiver. However, it should be understood that a single packet receiver shown in FIG. 2 illustrates one or more packet receivers associated with a predetermined packet generator. Thus, for example, when the packet generator 212 generates packets of type A, the packet generator 212 transmits the packets to one or a plurality of packet receivers shown as the packet receiver 230. The packet receivers illustrated in FIG. 2 could be implemented using PCs having the Linux operating system and custom application software for receiving data packets such as UDP data packets from the packet generators. However, similar to the packets generators, the software application is not specific to the operating system, and other types of operating systems could also be used such as other Unix-based operating system, for example. Further, the packet receivers could be implemented using Micron PCs having Pentium III processors. However, the exemplary embodiment is not limited to Micron PCs having Pentium III processors, and PCs with faster or slower processors could also be used.

Figure 3:
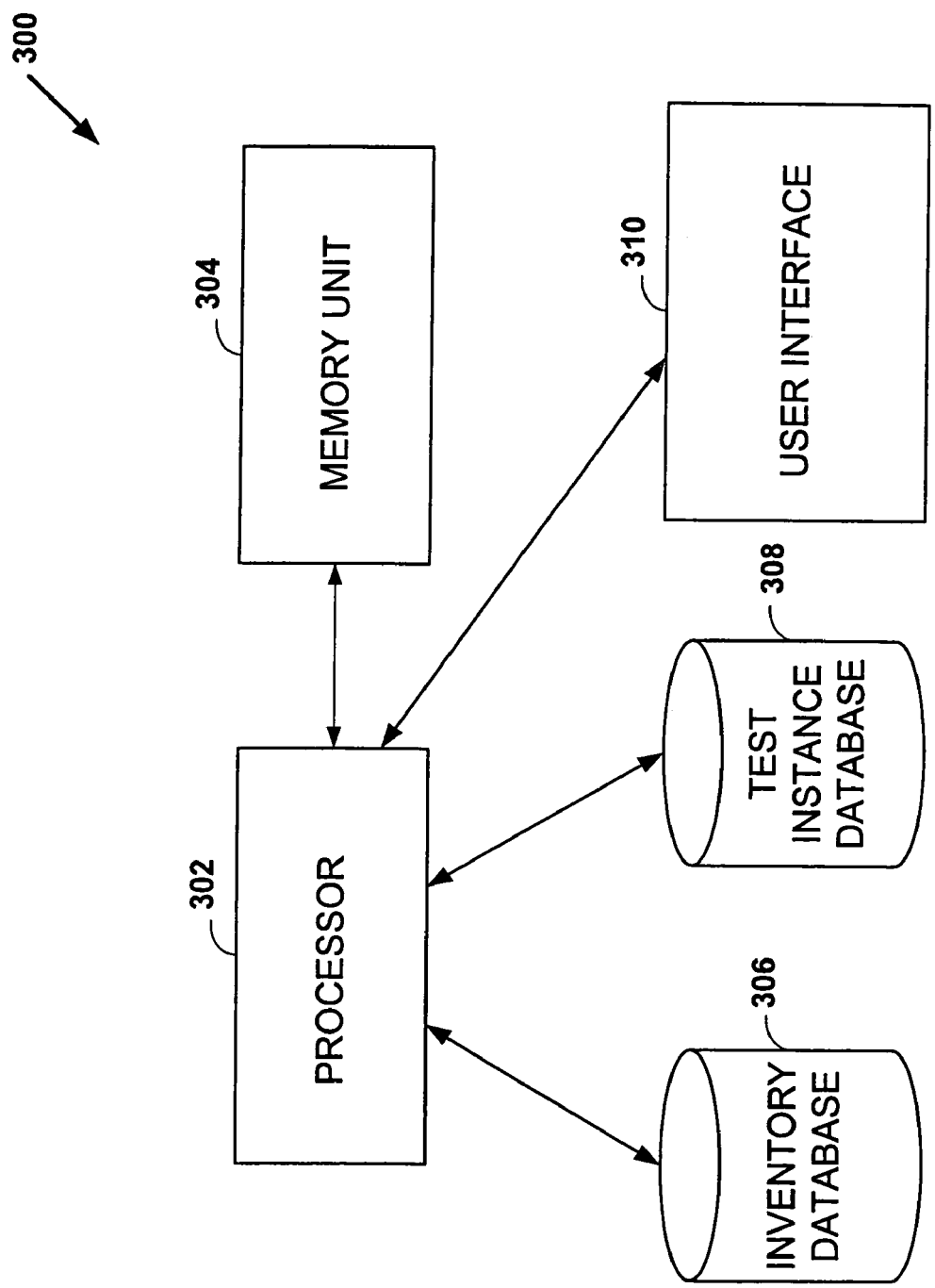
FIG. 3 illustrates an exemplary architecture of a control network device that may be employed in an exemplary network performance testing system according to an exemplary embodiment.

The control network device 202 is a network management device that configures the devices in the network performance testing system 200 shown in FIG. 2. FIG. 3 illustrates an exemplary architecture 300 associated with the control network device 202. The control network device 202 may include a processing unit 302, a memory unit 304, an inventory database 306, a test instance database 308 and a user interface 310. In one embodiment, the control network device may include the databases illustrated in FIG. 3. Alternatively, the databases could be external databases having communication links with the control network device 202. In one embodiment, the control network device 202 could be implemented using a Micron PC with the processing unit 302 including a Pentium III processor, and the memory unit including a memory device such as a Read Only Memory unit ("ROM") or/and a Random Access Memory ("RAM") unit. However, slower or faster processors could also be used to implement the control network device 202. Further, more than one control network device could also be used, where each control network device could handle a predetermined set of functional operations. For example, one of a plurality of control machines could be exclusively used for data storage, and a second control network device could be exclusively used to process test performance data, for example. Other embodiments are possible as well.

In one embodiment, the control network device 202 provides test information data for the packet generators, as well as configuration files for the packet generators and packet receivers. Additionally, the control network device 202 stores information data for running network performance tests and network test performance results associated with each test. Further, the control network device 202 analyzes the test data collected at the packet receivers and creates a database record for each test. According to an exemplary embodiment, once the control network device 202 creates a test performance record, the record can be accessed and viewed by system administrators. The control network device 202 includes a number of databases, one or more web servers, and scripts. In one embodiment shown in FIG. 3, the control network device 202 includes two databases, the inventory database 306 and the test instance database 308. The inventory database 306 stores information data of network devices in a network performance testing system associated with the control network device 202.

In one embodiment, the inventory database 306 stores data under a number of different categories such as a general category, a device under testing ("DUT") category, and a mixed category. According to an exemplary embodiment, data associated with the packet generators, packet receivers and switches are stored under the general category. For example, the packet generator data include names, IP addresses, login, passwords, and process IDs for each generator process, and the packet receiver data include names, login, passwords, and process IDs for each receiver process. Further, the switch data may include names and IP addresses for each switch used in the system. Additionally, in one embodiment, data associated with network devices for which network performance tests are conducted are stored under the DUT category. For example, in a data-over-cable system, the DUT category could include cable modem data and cable head-end data. In one embodiment, the cable modem data include a Medium Access Control ("MAC") address of each cable modem in the network performance testing system. Further, the head-end data could include CMTS data such as a name, login, password and IP address of one or more CMTSs in a system. Finally, the mixed category includes test configuration data such as available packet rates, packet sizes, test duration times, cable head-ends' data, packet generators' data, and packet receivers' data. According to an exemplary embodiment, a system administrator may create new test configuration parameters and store them under the mixed category so that a system provides a great degree of flexibility in network performance testing. For example, a system administrator may specify new types of packets in the test configuration data. Further, the system administrator may add data for new DUTs under the DUT category.

According to an exemplary embodiment, the test instance database 308 on the control network device 202 stores test information data that are needed to run a network performance test and results associated with each network performance test. In one embodiment, the test information data include a unique identifier for each test, test configuration data associated with each test identifier, a start time of each test, a stop time of each test, a number of packets sent per each network device in the system, such as a number of packets sent per each cable modem, a number of packets received per cable modem, and any cable modem resets that might have happened during a duration of each test. However, the exemplary embodiment is not limited to storing these parameters, and fewer, more, different or equivalent parameters could also be stored in one or more databases of the control network device 202. Alternatively, as mentioned in the proceeding paragraphs, a separate control network device in communication with the control network device 202 could be arranged to store the test performance data.

As shown in FIG. 3, the control network device 202 further includes the user interface 310. For example, the user interface 310 may include one or more web server. As is known in the art, a web server is a program that, using a client/server modem and the World Wide Web's HTP, serves files that form Web pages to Web users. According to an exemplary embodiment, the Web server may provide a main interface to the network performance testing system 200 for system administrators. In one embodiment, a system administrator may use a Web browser to create test configurations, view results of test instances, start tests, or monitor the progress of each test. For example, the control network device 202 could use an Apache Web server, a Web server typically used for UNIX-based operating systems. However, different or equivalent Web servers could also be used, and the exemplary embodiment is not limited to the Apache Web servers.

Further, the control network device 202 includes scripts. As is known in the art, a script includes a list of operating system commands that are prestored in a file and are performed sequentially by the operating system's command interpreter whenever the list name is entered as a single command. For example, the memory unit 304 may store the scripts that may be retrieved by the processor unit 302. According to an exemplary embodiment, the web pages may call one or more scripts to do a predetermined set of actions associated with each script that has been called. For example, the scripts may issue start and stop messages to the data generators and receivers as well as may configure network switches, as described below in greater detail.

As shown in FIG. 2, the network testing system 200 includes a number of network switches such as Ethernet switches that allow the network testing system's components to establish communication sessions. In one embodiment, the Ethernet switches could be implemented using, for example, 3Com SuperStack II 3800/9000/9400 switches. However, different or equivalent types of switches could also be used. According to an exemplary embodiment illustrated in FIG. 2, a plurality of Ethernet switches connect packet generators, cable modems and packet receiver to a device under testing (CMTS 222). In one embodiment, the Ethernet switches have a Virtual Local Area Network ("VLAN") topology. The use of the VLAN topology in the Ethernet switches simplifies physical connections in the network testing system 200 and allows the control network device 202 to configure the Ethernet topology without the system administrators' interaction. However, the exemplary embodiment is not limited to the VLAN topology switches, and any existing or later developed types of switches could also be used.

According to an exemplary embodiment, the Ethernet switches illustrated in FIG. 2 are associated with four different categories: cable modem switches, client side switches, server side switches, and backbone concentrator switches. In the exemplary embodiment, if the Ethernet switches are VLAN switches, there is one VLAN for each cable modem plugged into a cable modem switch. The VLAN in the cable modem switch includes two ports: an untagged port for a cable modem and a tagged port for a Gigabit uplink connection.

As is known in the art, in a conventional untagged forwarding, as a packet traverses a network, each router extracts all the information relevant to forwarding from a packet header (Layer 3 header). This information is then used as an index for a routing table look-up to determine the packet's next hop. In the most common case, the only relevant field in the header is the destination address field, but in some cases other header fields could also be analyzed. As a result, the header analysis must be done independently at each router through which the packet passes, and a complicated look-up must also be done at each router. On a contrary, as a packet stream is presented to a tagged switch, it analyzes a network-layer of each packet, selects a route for each packet from its internal routing tables, attaches a tag from its Tag Information Base ("TIB"), and forwards the packet to the next-hop tagged switch that typically is a core tagged switch. The core switch then forwards the packet solely on the basis of the tag, eliminating the need to re-analyze the header. As the packet reaches the egress point of the network, the tag is stripped off, and the packet is delivered to a target device.

According to an exemplary embodiment, the Gigabit tagged port of each cable modem switch is connected to a backbone concentrator that connects local area networks to a wide area network. Further, according to an exemplary embodiment, a backbone concentrator switch includes a VLAN switch for every cable modem that is arranged to pass data packets during a network performance test in the system 200. In one embodiment, each VLAN switch on the backbone concentrator switch includes two tagged ports. A first port is connected to an uplink port of a cable modem switch, and a second port is an uplink port of a client switch. Such a port arrangement on the backbone concentrator switch creates a mapping for each side A port under test to each side B port under test.

The client switch provides mapping of network performance data packets to packet receivers. According to an exemplary embodiment, during a network performance test run time, VLANs on the client switches are configured. In one embodiment, during a network performance test, VLANs on the client switches are configured for each cable modem that has been selected to pass network test data packets (a one-to-one mapping). Further, according to an exemplary embodiment, each VLAN on the client switch includes three tagged ports. For example, a first port is an uplink port, a second port connects to a packet receiver, and a third port provides an upstream connection link for an upstream packet sender. Further, each packet receiver is connected to a separate port on the client switch.

The present invention is not limited to the use within the system illustrated in FIG. 2. More, fewer or different components, connections or interfaces could also be used. Further, the arrangements described herein are shown for purposes of illustration only, and those skilled in the art will appreciate that other arrangements and other elements, such as interfaces or functions, whether or not known in the art, can be used instead, and some elements may be omitted altogether. Additionally, as in most communication applications, those skilled in the art will appreciate that many of the elements described herein are functional entities that may be implemented as discrete components or in conjunction with other components, in any suitable combination and location.

Network performance testing methods according to an exemplary embodiment can be applied with many different network devices such as hubs and network switches, and the methods are not limited to a data-over-cable system. However, the exemplary network test performance methods will be hereinafter described in a data-over-cable system environment and will address the network performance testing of a CMTS.

FIGS. 4A and 4B are a flow chart illustrating an exemplary method 400 for setting up a network performance test by a control network device according to an exemplary embodiment. Referring to FIG. 4A, at step 402, a device under testing is selected. In one embodiment, a system administrator may select a device under testing via a graphical user interface on the control machine, for example. In another embodiment, a system administrator may select more than one device under testing for a network performance testing. Further, the system administrator selects testing paths in a network test performance testing system. According to an exemplary embodiment, an inventory database associated with the control network device stores a list of network devices in the system. In an exemplary embodiment associated with the method 400, the system administrator selects cable modems or, specifically, MAC addresses of the cable modem, to specify the network testing paths. Alternatively, if a network performance test method is employed in a system other than a data-over-cable system, a system administrator could select a plurality of ports that the network performance test should run through.

At step 404, the system administrator selects test configuration data. In one embodiment, the inventory database associated with the control network device stores a number of identifiers associated with different test configurations so that a system administrator may simply select an identifier associated with a desired test configuration. According to an exemplary embodiment, each test configuration identifier could be associated with a predetermined packet rate, packet size, test duration, and predetermined packet generators, packet receivers and one or more devices to be tested. Alternatively, if an identifier for a desired test setting does not exist, a system administrator could define test configuration data via one or more test configuration graphical interfaces on the control machine. In such an embodiment, the control network device would create a new identifier for the defined test configuration data and store the new identifier associated with the defined configuration data in the inventory database.

At step 406, the control network device starts a test script based on the test configuration identifier selected by the system administrator. At step 408, the test script retrieves test configuration data associated with the selected identifier from the inventory database. Thus, according to an exemplary embodiment, the test configuration data defines, for example, a type of packet, size of packet or packet rate for each packet generator employed in the network performance testing.

At step 410, the network switches are configured based on the selected test configuration data. According to an exemplary embodiment, the network switches employed in the exemplary system are Ethernet switches having VLAN topology so that the control network device can configure Ethernet topology without the human intervention. However, other embodiments are possible as well. According to an exemplary embodiment, the control network device configures VLANs on the client switches so that for every cable modem selected to pass network test data a one to one mapping is created on each VLAN associated with the client switch. Further, in one embodiment, each VLAN in the client switch has three tagged ports. According to an exemplary embodiment, a first port is an uplink port, a second port is connected to a packet receiver, and a third port is associated with an upstream connection of a packet generator. At step 412, the control network device disables packet receivers that have been selected for the network performance test.

Referring to FIG. 4B, at step 414, the control network device generates a configuration file for each packet generator and packet receiver employed in the network performance test. According to an exemplary embodiment, to reduce the load on each packet receiver, the selected cable modems associated with a single packet generator may be distributed across multiple packet receivers. For example, a first packet receiver may be associated with a first cable modem, a second packet receiver may be associated with a second cable modem and so forth. However, the exemplary embodiment is not limited to such an arrangement, and different embodiments are also possible. Further, since cable modems are network bridges, it is necessary to have a unique MAC address and IP address for each customer premise equipment entity being simulated.

According to an exemplary embodiment, each packet generator simulates a plurality of customer premise equipment entities so that when a packet generator associated with a cluster of cable modems starts sending test data packets to one or more packet receivers, each of the cable modems assumes that there is one or more customer premise equipment entity sending data via each of the cable modems. In such an embodiment, when the control network device generates a configuration file for a packet generator, a configuration file includes a plurality of MAC addresses and IP addresses to simulate the functionality of at least one customer premise equipment entity behind each cable modem associated with the packet generator. For example, if only one customer premise equipment is simulated for each cable modem associated with a packet generator, the configuration file defines a one to one mapping from each cable modem to a VLAN to a simulated customer premise equipment entity's MAC address and IP address. In the embodiment illustrated in FIG. 2, if the packet generator 212 were to simulate a single customer premise equipment entity functionality for each of the cable modems 120A, 120C, 120E and 120G, a configuration file for the packet generator 212 would define four address pairs. For example, the configuration file may include an IP address 192.77.1.1, a MAC address 00:01:00:00:01:01 and a predetermined VLAN number to simulate a single customer premise equipment entity behind the cable modem 120A, for example. In such an embodiment, when the packet generator 212 generates test data packets for transmission via the cable modem 120A, the packet generator 212 uses the received IP address 192.77.1.1 and MAC address 00:01:00:00:01:01 to generate the test data packets for transmission via the cable modem 120A.

Further, according to an exemplary embodiment, the configuration file sent from the control network device to each packet generator includes destination data of one or more packet receivers associated with each packet generator. In one embodiment, if a single packet generator is associated with multiple packet receivers that are arranged to receive test data packets from one or more predetermined cable modems, the configuration file for a packet generator includes configuration data of each packet receiver associated with the packet generator. At step 416, the control network device sends the configuration file to each packet receiver and packet generator selected for the network performance testing. The packet generators and receiver use the received parameters from the configuration files to configure their internal applications.

At step 418, the control network device enables the packet receivers so that the packet receivers can start receiving test data packets from the associated packet generators. In one embodiment, the control network device may send a remote shell ("rsh") command to the packet receivers to initiate a packet receiving process. The "rsh" command enables a calling network device (the control network device) to execute commands on a called network device (the packet receivers). The method for receiving test data packets on packet receivers will be further described in FIG. 6.

At step 420, a routing cache is established on a device under testing for each packet receiver used in the network testing system. According to an exemplary embodiment, each of the packet receivers may send an Address Resolution Protocol ("ARP") request message to the device under testing so that the device under testing may update its internal routing table cache. As is known in the art, the ARP is a protocol used for mapping an IP address to a MAC address that is a recognizable network address on a local network. In an exemplary embodiment, when an incoming data packet destined for a particular packet receiver arrives at the device under testing, the device under testing must retrieve its routing table to determine whether a MAC address entry exist for a particular IP address specified in the data packet. If the device under testing finds a MAC address for the IP address specified in the data packet, the packet data can be forwarded to a predetermined packet receiver. Thus, when the device under testing receives ARP request messages from each packet receiver used in the system, the device under testing may update its routing table cache to create address mappings. In such an embodiment, when the device under testing receives a data packet destined to a registered packet receiver, the device under testing retrieves an address mapping associated with the registered packet receiver and forwards the data packet to that packet receiver.

At step 422, the control network device enables the packet generators to start a network test performance process that will be further described in FIG. 5.

According to the exemplary method 400 illustrated in FIGS. 4A and 4B, the device under testing is the CMTS 222. However, the exemplary embodiment should not be viewed as limited to data-over-cable systems or testing a CMTS, and the method 400 could also be applied for testing other devices such as hubs or network switches.

According to an exemplary embodiment, the operation of the packet generators and packet receivers is controlled by the control network device 202 that provides the centralized management functionality and analyzes results of network performance tests.

FIG. 5 is a flow chart illustrating an exemplary method 500 for operation of packet generators according to an exemplary embodiment. At step 502, a packet generator receives a first message from a control network device. In one embodiment, the first message includes data of one or more packet receivers and performance test settings. According to an exemplary embodiment, the performance test settings define a type of packets to be generated on a packet generator, a number of packets, a rate of sending packets (packets per second), and a size of packets, for example. However, the exemplary method 500 is not limited to these network performance setting parameters, and fewer, more, different or equivalent network performance testing parameters could also be specified in the first message.

At step 504, when the packet generator receives the first message, the packet generator creates a number of applications (worker threads) within its network testing application. For example, each application may be arranged to generate and send test data to a predetermined number of packet receivers. In one embodiment, each worker thread is assigned an equal portion of a total number of the packer receivers specified in the first message. At step 506, the packet generator establishes a communication link with each packet receiver specified in the first message received from the control machine. According to an exemplary embodiment, the created worker threads establish communication links with packet receivers associated with each worker thread via a TCP port.

At step 508, the packet generator sends a second message to each packet receiver having a communication link with the packet generator. In one embodiment, the second message includes the test performance settings such as a size of packets and a number of packets that will be sent from the packet generator.

At step 510, the packet generator generates test data packets using the performance test settings specified by the control network device in the first message. According to an exemplary embodiment, the packet generator generates the test data packets having a predetermined size, and a predetermined protocol format such as UDP packet format defined in the first message. Further, when the packet generator generates each packet, the packet generator may include a 4-byte sequence number (a monotonically increasing number) and a time stamp in each generated packet. Additionally, according to an exemplary embodiment, the packet generator may fill the rest of each generated packet with data so that each packet has a predetermined size defined by the control network device in the first message. In one embodiment, the packet generator may fill the generated packet with ASII data, for example. However, different embodiments are also possible. According to an exemplary embodiment, when the packet generator generates each packet, the packet generator is tagged to a particular VLAN that may use Ethernet header tags such as the tags described in the IEEE 802.1Q specification.

At step 512, the packet generator sends the generated test data packets to the packet receivers. According to an exemplary embodiment, the packet generator sends the data packets for a predetermined time period and at a predetermined rate specified in the first message. In one embodiment, the packet generator simultaneously generates the test data packets and sends them to the packet receivers. Alternatively, the packet generator may first generate all test data packets, buffer them in a memory unit and, then, send the test data packets to the packet receivers at a predetermined rate and for a predetermined period of time specified in the first message.

At step 514, when the requested number of data packets has been sent, the packet generator sends a third message to the packet receivers. According to an exemplary embodiment, each worker thread sends a third message to its assigned set of packet receivers upon a completion of the network performance test. In one embodiment, the third messages signal the packet receivers that the packet generator has finished sending the test data packets. According to an exemplary embodiment, each worker thread contacts the packet receiver via a different port than a port that was used for sending the test data packets. In one embodiment, each worker thread may use a TCP port that was not used during the transmission of the test data packets. However, the exemplary embodiment is not limited to sending test information messages to packet receivers via TCP ports, and other types of connections could also be used, such as UDP or unframed ASCII over serial, for example.

According to the exemplary method 500, the packet generator is packet generator A 212, the control network device is the control network device 202, and the packet receivers are packet receivers A 230 illustrated as a single device in FIG. 2. In such an embodiment, an upstream network performance is tested. However, the exemplary embodiment is not limited to testing network performance only in an upstream direction, and a downstream network performance could also be tested. For example, to test a downstream network performance, the packet generator described in the method 500 could be the packet generator 232 or 224 sending the test data packets to packet receivers 214 and 216, respectively. Further, the exemplary method 500 is not limited to these network devices and fewer, different or equivalent network devices could also be used to execute the steps of method 500. Further, the exemplary method 500 has been described in reference to a single packet generator. However, the method 500 is not limited to one packet generator and, according to an exemplary embodiment, each packet generator in the exemplary network testing system 200 may simultaneously receive messages from the control network device, where a message for each packet generator may specify different performance test settings. For example, the control network device 202 may indicate different types of test data packets to be generated on each packet generator so that more than one type of data packets is simultaneously sent from the packet generators over the system. Further, each network performance test can be set up in such a way so that it includes a number of different tests, where the control network device 202 controls a packet generator to consequently generate and send packets at different packet rates, packet sizes, and packet types. Further, the exemplary method 500 is not limited to a unidirectional network performance testing, and the network performance test could be simultaneously applied in an upstream direction and a downstream direction.

FIG. 6 is a flow chart illustrating an exemplary method 600 for an operation of packet receivers according to an exemplary embodiment. At step 602, each packet receiver establishes a communication link with a packet generator. In one embodiment, the packet receivers establish communication links via a TCP port, for example. However, other embodiments are possible as well.

At step 604, the packet receiver receives a first message from a packet generator defining test performance settings via the established communication link on the TCP port. According to an exemplary embodiment, the test performance settings in the first message define how many test performance data packets the packet receivers should expect, and the size of the data packets that will be sent from the packet generator. However, the exemplary method 600 is not limited to defining a number and size of the data packets in the first message, and different parameters could also be specified.

At step 606, the packet receivers receive performance test data packets from the packet generator via one or more devices under testing. According to an exemplary embodiment, upon a receipt of each packet, the packet receivers count each received data packets and, further, establishes a record of each received packet. According to an exemplary embodiment, during the time of receiving the packets, at step 608, the packet receivers simultaneously determine whether the packet generator has completed the process of sending the network performance test data packets. In one embodiment, when the packet generator generates and sends the last data packet, the packet generator generates a message defining a completion of a network performance test and sends the message to each packet receiver. Further, according to an exemplary embodiment, the message is directed to a port on each packet receiver that has not been used for receiving the data packets from the packet generator. Thus, to determine whether the network performance test has been completed, a packet receiver determines whether the message defining the network performance test completion has been received on one of the ports that has not been used for receiving the performance test data packets. If the packet receiver has not received the message defining the network performance test completion, the method 600 continues at step 606 and 608, as shown in FIG. 6.

If a packet receiver determines that the network test performance test has been completed, at step 610, the packet receiver generates a test performance record using the received test performance data packets. In one embodiment, the packet receiver may record in the test performance record a number of received packets. Additionally, the packet receiver may use a sequence number specified in each packet to determine and record which packets in a sequence of received packets were lost during the transmission from the packet generator. Further, the packet receiver could determine the latency of the network using a time stamp specified in each data packets. At step 612, the packet receivers store the network test performance record. In one embodiment, the packet receiver could store the record in its internal database. Alternatively, the packet receivers could communicate with an external database arranged to store network performance records generated by each packet receiver in a system. In such an embodiment, the packet receiver could send the performance record to a predetermined external database.

According to the exemplary method 600, the packet receivers could be packet receivers A 230 that receive network test data packets from the packet generator A 212 illustrated in FIG. 2. In such an embodiment, a network performance of a device under testing in an upstream direction could be tested. However, the exemplary method 600 is not limited to network performance testing in the upstream direction, and it could be used for network performance testing in a downstream direction. In such an embodiment, the packet receivers described in the method 600 could be the packet receivers 214 and 216, for example. However, the exemplary embodiment is not limited to the network devices illustrated in FIG. 2, and the method 600 could also be applied in systems other than data-over-cable systems. Further, the method 600 has been described in a unidirectional data flow context. However, it should be understood that the method 600 may be applied to simultaneously configure packet receivers on both sides of a device under testing, so that network performance of the device under testing is simultaneously determined in downstream and upstream directions.

Upon a completion of a network performance test, the control network device processes network performance test records generated by each packet receiver. FIG. 7 is a flow chart illustrating an exemplary method 700 for an exemplary system operation upon a completion of the network performance test.

At step 702, network performance test data from packet receivers are provided to a control network device. In one embodiment, upon a completion of a network performance test, packet receivers may create a test record of each received data packet and may store the test record in a predetermined database associated with each packet receiver. For example, when a packet receiver creates a test record, the packet receiver may record which packets have been received, and which packets have been lost. In an embodiment where a packet receiver stores a test record in a database, the control network device may access and retrieve the test records from the database associated with the packet receiver. Alternatively, when a packet receiver generates a test record, the packet receiver may send the test record to the control network device via a management network.

At step 704, when the control network device receives the test records from each packet receiver upon the completion of the network performance test, the control machine processes the received data to generate network performance test results associated with a device under testing. According to an exemplary embodiment, the control network device determines, for example, latency, throughput, or delays associated with each transmission path. Further, according to an exemplary embodiment, the control network device may monitor and record any resets of network devices such as resets of cable modems during the network performance test.

At step 706, the control network device stores the network performance test results in a test instance database. In an embodiment where a network performance test includes a plurality of network performance tests having a script on a packet generator that runs several times and changes, for example, the rate of packets for each test run, the control machine may create a test result record as a collection of test results ordered by the items changing between each conducted test.

At step 708, the control network device displays the network performance test results via a graphical user interface. According to an exemplary embodiment, the control network device may display test results via web pages generated on the control machine. However, the exemplary embodiment is not limited to displaying the test results via the web pages, and other embodiments are also possible.

In the exemplary method 700, the control network device is the control network device 202 in communication with the packet receivers used during the network performance testing such as packet receivers 228, 230, 214, and 216, and the device under testing is the CMTS 222. However, the exemplary method 700 is not limited to these network devices or a data-over-cable system, and it could be applied in different systems.

An operating environment for the described embodiments includes a processing system with at least one high speed Central Processing Unit ("CPU") or other processing unit and a memory system. In accordance with the practices of persons skilled in the art of computer programming, the described embodiments with reference to acts and symbolic representations of operations or instructions that are performed by the processing system, unless indicated otherwise. Such acts and operations or instructions are sometimes referred to as being computer-executed, or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium readable by the CPU or other processing unit. The computer readable medium includes cooperating or interconnected computer readable media, which exist exclusively on the processing system or are distributed among multiple interconnected processing systems that may be local or remote to the processing system. In particular, the methods can be executed by a processing unit in response to, or responsively to, instructions stored in or on a computer readable medium.

Further, in view of many embodiments to which the principles of the invention may be applied, it should be understood that the illustrated embodiments are exemplary embodiments and should not limit the present invention as defined by the claims. Further, the exemplary embodiments have been described in reference to a data-over-cable network. However, the present invention is not limited to the data-over-cable networks, and it could also be used in other types of networks such as a Microwave Multi-Point Distributed System ("MMDS"), for example. In such a system, the cable system may be replaced with a point headend to a multipoint microwave system. Further, unless specified to the contrary, the steps of the flow charts may be taken in sequence other than those described, and more, fewer or equivalent elements or components could also be used.

We claim:

1. A system for network test performance testing, the system comprising in combination:
    a control network device configured to send network test performance settings;
    at least one test data generator configured to receive the network test performance settings from the control network device and generate test data using the network test performance settings;
    a plurality of network entities configured to receive the test data from the at least one test data generator via at least one network switch, and
    the at least one network switch is configured to enable data communication from the at least one test data generator to the plurality of network entities;
    wherein the control network device configures the at least one test data generator to generate test data for the plurality of network entities and sends the generated test data via the plurality of network entities, and the control network device provides at least one configuration file to the at least one test data generator, the at least one configuration file comprising a plurality of network address pairs; and
    wherein the at least one test data generator employs a unique address pair from the plurality of address pairs to generate test data for each of the plurality of network entities.

2. A system for network test performance testing, the system comprising in combination:
    a control network device configured to send network test performance settings;
    at least one test data generator configured to receive the network test performance settings from the control network device and generate test data using the network test performance settings;
    a plurality of network entities configured to receive the test data from the at least one test data generator via at least one network switch; and
    the at least one network switch configured to enable data communication from the at least one test data generator to the plurality of network entities;
    wherein the control network device configures the at least one test data generator to generate test data for the plurality of network entities and sends the generated test data via the plurality of network entities, and the control network device provides at least one configuration file to the at least one test data generator, the at least one configuration file comprising a plurality of network address pairs; and
    wherein each of the plurality of network address pairs comprises a Medium Access Control address and an Internet Protocol address.

3. A system for network test performance testing, the system comprising in combination:
    a control network device configured to send network test performance settings;
    at least one test data generator configured to receive the network test performance settings from the control network device and generate test data using the network test performance settings;
    a plurality of network entities configured to receive the test data from the at least one test data generator via at least one network switch; and
    the at least one network switch configured to enable data communication from the at least one test data generator to the plurality of network entities;
    at least one entity under testing configured to receive the test data from the plurality of network entities; and
    at least one test data receiver configured to receive the test data from the plurality of network entities via the device under testing, the at least one test data receiver configured to provide the received test data to the control network device,
    wherein the control network device generates a test result record based on the test data received from the at least one test data receiver.

4. The system as claimed in claim 3, wherein the at least one entity under testing comprises at least one cable modem termination system, network router or network switch.

5. A system for network test performance testing, the system comprising in combination:
    a control network device for sending test performance settings to at least one test data generator arranged to generate and send test data via a plurality of network entities to at least one test data receiver; and
    the at least one test data receiver arranged to receive the test data from the at least one test data generator via the plurality of network entities and provide the received test data to the control network device,
    wherein the control network device processes the received test data and generates a network test performance record.

6. The system as claimed in claim 5, further comprising, a device under testing arranged to receive the test data from the plurality of network entities and send the test data to the at least one test data receiver.

7. The system as claimed in claim 5, wherein the control network device employs the test performance settings and the test data received from the at least one test data receiver to generate the network test performance record.

8. The system as claimed in claim 5, further comprising, at least one network switch configured to enable the at least one test data receiver to receive the test data via the plurality of network entities, the network switch configured to enable data communication from the at least one test data generator to the plurality of network entities.

9. The system as claimed in claim 5, wherein the plurality of network entities comprises a plurality of network ports.

10. The system as claimed in claim 5, wherein the plurality of network entities comprises a plurality of network devices.

11. The system as claimed in claim 10, wherein the plurality of network devices comprises a plurality of cable modems.

12. A system for network test performance testing, the system comprising:
    a control network device configured to send network test performance settings;
    at least one test data generator configured to receive the network test performance settings from the control network device and generate test data using the received network test performance settings;

a plurality of network entities configured to receive the test data from the at least one test data generator via at least one network switch;

the at least one network switch configured to enable data communication from the at least one test data generator via the plurality of network entities to at least one test data receiver; and the at least one test data receiver configured to receive the test data from the plurality of network entities via a device under testing, wherein the at least one test data receiver is configured to provide the received test data to the control network device.

13. The system as claimed in claim 12, wherein the control network device generates a performance test result record using the test data received on the at least one test data receiver.

14. A network device for managing a network performance test for at least one device under testing, the network device comprising in combination:

a first database for storing configuration data for a plurality of test data generators, a plurality of test data receivers, the at least one device under testing and network switches interconnecting the plurality of test data generators and test data receivers to the at least one device under testing;

a second database for storing test configuration data, wherein a test configuration is associated with an identifier, the identifier comprising a plurality of network performance settings;

a first application process, responsive to a selection of a test configuration identifier, for configuring the plurality of test data generators, test data receivers, and network switches, wherein each test data generator is configured to generate a plurality of data packets based on a network performance settings associated with the selected test configuration identifier, each test data generator is further configured to send the generated data packets via a plurality of network ports and the at least one device under testing to at least one test data receiver;

a data pull process for communicating with the plurality of test data receivers, the data pull process being configured to download and store data from the plurality of test data receivers, wherein the data comprises received test data;

a second application process for generating a network performance test result record upon the download of the data from the plurality of test data receivers; and a third application process for outputting the network performance test result record to a user of the network device.

15. The network device as claimed in claim 14, wherein the first application process generates a configuration file for each test data generator and test data receiver, a configuration file for a test data generator comprising a plurality of network address pairs, a unique address pair being used on the test data generator to generate data packet for transmission via each of the plurality of ports.

16. A method for network performance testing, the method comprising:

selecting network test performance settings comprising test data settings and a test data path, wherein the test data path comprises at least one test data generator, a plurality of network entities, a device under testing, and at least one test data receiver;

configuring network switches for data transmission from the at least one test data generator via the plurality of network entities and the device under testing to the at least one test data receiver;

receiving the test data settings on the at least one test data generator;

generating test data on the at least one test data generator based on the received test data settings;

sending the generated test data via the plurality of network entities and the device under testing to the at least one test data receiver;

receiving the test data on the at least one test data receiver;

creating a received test data record on the at least one test data receiver, the record comprising data associated with the received test data; and generating a network performance test record using the test data record from the at least one test data receiver.

17. A method for network performance testing, the method comprising:

selecting network test performance settings comprising test data settings and a test data path, wherein the test data path comprises at least one test data generator, a plurality of network entities, a device under testing, and at least one test data receiver;

configuring network switches for data transmission from the at least one test data generator via the plurality of network entities and the device under testing to the at least one test data receiver;

receiving the test data settings on the at least one test data generator;

generating test data on the at least one test data generator based on the received test data settings;

sending the generated test data via the plurality of network entities and the device under testing to the at least one test data receiver; and displaying the network performance test record via a graphical user interface.

* * * * *